United States Patent
Gebhard

(10) Patent No.: US 9,247,323 B2
(45) Date of Patent: Jan. 26, 2016

(54) METHOD AND NETWORK NODE FOR CONFIGURING A NETWORK FOR OPTIMIZED TRANSPORT OF PACKET TRAFFIC

(75) Inventor: Ulrich Gebhard, Ludwigsburg (DE)

(73) Assignee: Alcatel Lucent, Boulogne-Billancourt (FR)

(*) Notice: Subject to any disclaimer, the term of this patent is extended or adjusted under 35 U.S.C. 154(b) by 399 days.

(21) Appl. No.: 13/990,132

(22) PCT Filed: Dec. 2, 2011

(86) PCT No.: PCT/EP2011/071658
§ 371 (c)(1),
(2), (4) Date: May 29, 2013

(87) PCT Pub. No.: WO2012/084462
PCT Pub. Date: Jun. 28, 2012

(65) Prior Publication Data
US 2013/0259472 A1    Oct. 3, 2013

(30) Foreign Application Priority Data
Dec. 20, 2010   (EP) .................................. 10195939

(51) Int. Cl.
*H04J 14/00*       (2006.01)
*H04Q 11/00*       (2006.01)
(Continued)

(52) U.S. Cl.
CPC ............ *H04Q 11/0001* (2013.01); *H04L 45/38* (2013.01); *H04L 45/58* (2013.01); *H04L 45/74* (2013.01); *H04L 47/125* (2013.01); *H04L 45/62* (2013.01)

(58) Field of Classification Search
CPC ............ H01J 14/0267; H01J 14/0269; H04Q 11/0001; H04Q 11/0066; H04Q 2011/0073
See application file for complete search history.

(56) References Cited

U.S. PATENT DOCUMENTS 7,009,987 B1   3/2006   Matsuzawa
7,127,180 B1   10/2006  Khera et al.
(Continued)

FOREIGN PATENT DOCUMENTS

JP   2001045052   2/2001
JP   2003258870   9/2003
(Continued)

OTHER PUBLICATIONS

Ruffini, M. et al; A Testbed Demonstrating Optical IP Switching (OIS) in Disaggregated Network Architectures; Testbeds and Research Infrastructures for the Development of Networks and Communities, 2006; Tridentcom 2006; 2nd International Conference O N Barcelona, Spain, Mar. 1-3, 2006; Piscataway, NJ; USA; IEEE; Piscataway, NJ, USA Mar. 1, 2006; pp. 156-161; XP010924299; DOI: DOI:10.1109/TRIDNT.2006.1649141; ISBN: 978-1-4244-0106-2.

(Continued)

*Primary Examiner* — Daniel Dobson
(74) *Attorney, Agent, or Firm* — Patti & Malvone Law Group, LLC

(57) ABSTRACT

In order to configure a network for optimized transport of packet data traffic, a first packet node determines whether a traffic volume to be forwarded to a remote second packet node exceeds a predefined bypass threshold. If that is the case, the first packet node sends a bypass request towards the remote second packet node. An intermediate third packet node processes the request and determines, whether it locally has an interfering second bypass request and in this case, determines which of the two requests has a higher weight. The bypass request or, in case of an interfering second bypass request, the one with the higher weight, is then forwarded to the remote second packet node. Upon receipt thereof, the second packet node determines whether the received bypass request can be served. If that is the case, the bypass will be executed by sending a trigger to a service layer network to establish a bypass connection in accordance with the bypass request.

13 Claims, 4 Drawing Sheets

(51) Int. Cl.
*H04L 12/721* (2013.01)
*H04L 12/775* (2013.01)
*H04L 12/741* (2013.01)
*H04L 12/803* (2013.01)
*H04B 10/00* (2013.01)

(56) References Cited

U.S. PATENT DOCUMENTS

| | | | | |
|---|---|---|---|---|
| 7,606,494 | B1* | 10/2009 | Weston-Dawkes | H01J 14/0212 398/48 |
| 2007/0011284 | A1 | 1/2007 | Le Roux et al. | |
| 2010/0061719 | A1* | 3/2010 | Monga | H04J 14/0284 398/2 |
| 2011/0129222 | A1* | 6/2011 | Karol | H04J 14/0269 398/58 |
| 2013/0070754 | A1* | 3/2013 | Iovanna | H04J 45/00 370/351 |

FOREIGN PATENT DOCUMENTS

| JP | 2006211385 | 8/2006 |
|---|---|---|
| JP | 2006261732 | 9/2006 |

OTHER PUBLICATIONS

Munir, A. et al; Requests Provisioning Algorithms for Dynamic Optical Circuit Switched (DOCS) Networks: A Survey; Multitopic Conference, 2009, INMIC 2009; IEEE 13th International, IEEE, Piscataway, NJ, USA: Dec. 14, 2009; pp. 1-6; XP031612363; ISBN: 978-1-4244-4872-2.

Farrel, A. et al; A Path Computation Element (PCE)—Based Architecture; The Internet Society 2006; 40 pages; IETF Standard RFC 4655.

Ruffini, M. et al; Optical IP Switching for Dynamic Traffic Engineering in Next-Generation Optical Networks; Proceedings of the 11th International Conference on Optical Networking Design and Modeling; ONDM 2007; pp. 309-318.

International Telecommunication Union; Network Node Interface for the Synchronous Digital Hierarchy (SDH); Series G: Transmission Systems and Media, Digital Systems and Networks; ITU-T Standard G.7071Y.1322; Jan. 2007; 196 Pages.

International Telecommunication Union; Interfaces for the Optical Transport Network (OTN); Series G: Transmission Systems and Media, Digital Systems and Networks; ITU-T Standard G.709/Y.1331; Dec. 2009; 218 Pages.

* cited by examiner

METHOD AND NETWORK NODE FOR CONFIGURING A NETWORK FOR OPTIMIZED TRANSPORT OF PACKET TRAFFIC

FIELD OF THE INVENTION

The present invention relates to the field of telecommunications and more particularly to a method and related network nodes for configuring a network for optimized transport of data traffic.

BACKGROUND OF THE INVENTION

Data networks today mostly rely on packet switching technology where data signals are transmitted in the form of data packets, each containing a header with a destination address. Data packets are forwarded through the network from node to node until they reach their ultimate destination. A process referred to as routing directs packet forwarding based on the destination address contained in each data packet and locally stored routing information. The most common protocol in packet switched networks is known as the Internet Protocol (IP).

Since packets travel hop-by-hop towards their destination, every intermediate packet node or router has to process the packet header of each data packet to determine the routing. This is inefficient, causes delay at each router and contributes to high power consumption and equipment costs.

Often, IP routers use optical networks as underlying network technology for their interconnections at wide area. Optical networks forward data signals at much lower costs, both in terms of CAPEX and or OPEX. It is therefore desirable, to do as much forwarding in the optical layer as possible and avoid unnecessary header processing.

The article "Optical IP Switching for dynamic traffic engineering in next-generation optical networks" by M. Ruffini et al, proceedings of the 11th International Conference on Optical Networking Design and Modeling—ONDM 2007, pp. 309-318, describes a method to bypass routing when possible by dynamically creating an optical cut-through between adjacent optical nodes when the data examined between its upstream neighbor and its downstream neighbor is over a pre-established path threshold.

SUMMARY OF THE INVENTION

In order to establish an optical bypasses to optimize the optical layer, a router could monitor the traffic from previous hops to next hops to trigger a bypass as in the article cited above. This is however limited to one hop in a single step. Alternatively, a central decision maker could be provided, which collects information from network nodes to compute optimal paths through the network. Such central decision instance could be for example a path computing element (PCE) as described in IETF RFC 4655.

A problem that persist is how to keep the information collected up-to-date under varying traffic loads. Moreover complex algorithms would need to be developed for the path calculation in a central decision instance. In large networks this would be cumbersome and it is difficult for such algorithms to scale.

It is therefore an object of the present invention to provide an improved method and related network nodes for configuring a network for optimized transport of packet data traffic.

These and other objects that appear below are achieved in that a first packet node determines whether a traffic volume to be forwarded to a remote second packet node exceeds a predefined bypass threshold. If that is the case, the first network node sends a bypass request towards the remote second packet node. An intermediate third packet node processes the request and determines, whether it locally has an interfering second bypass request and in this case, determines which of the two requests has a higher weight. The bypass request or, in case of an interfering second bypass request, the one with the higher weight, is then forwarded to the remote second packet node. Upon receipt thereof, the second packet node determines whether the received bypass request can be served. If that is the case, the bypass will be executed by sending a trigger to a service layer network to establish a bypass connection in accordance with the bypass request.

That method can be implemented in any packet node or router. A packet node has a processing device such as a network processor that can be programmed to process data packets and make routing decisions based on the address information contained in each data packet and locally stored routing information. Such packet node has one or more transport interface for connection to an optical network node of the service layer network. The processing device is programmed to determine whether a traffic volume to be forwarded to a remote second packet node exceeds a predefined bypass threshold; and if so, to send a bypass request towards said remote second packet node.

To serve as an intermediate packet node, the network processor can further be programmed to process a first bypass request from an upstream packet node, and to determine whether it has a interfering local second bypass request and if that is the case, to determine which of the two requests has a higher weight; and to forward either said received first bypass request or, in case of an interfering local second bypass request, the one with the higher weight to a next hop towards along a path for which said bypass is requested.

A multi-layer network with a packet layer and optical transport layer can self organize the optimum combination of packet layer paths and optical layer paths or a specific traffic situation. It swings into the optimized multi-layer topology with every long-term traffic change. Avoiding packet header processing in intermediate packet nodes reduces delay, avoids congestions and improves the quality of experience.

The described method scales automatically with increasing network size and does not need a central decision maker. It will work also across intermediate routers which do not yet support the described protocol and thus allows step-by-step migration.

BRIEF DESCRIPTION OF THE DRAWINGS

Preferred embodiments of the present invention will now be described with reference to the accompanying drawings in which.

DETAILED DESCRIPTION OF THE INVENTION

Figure 1:
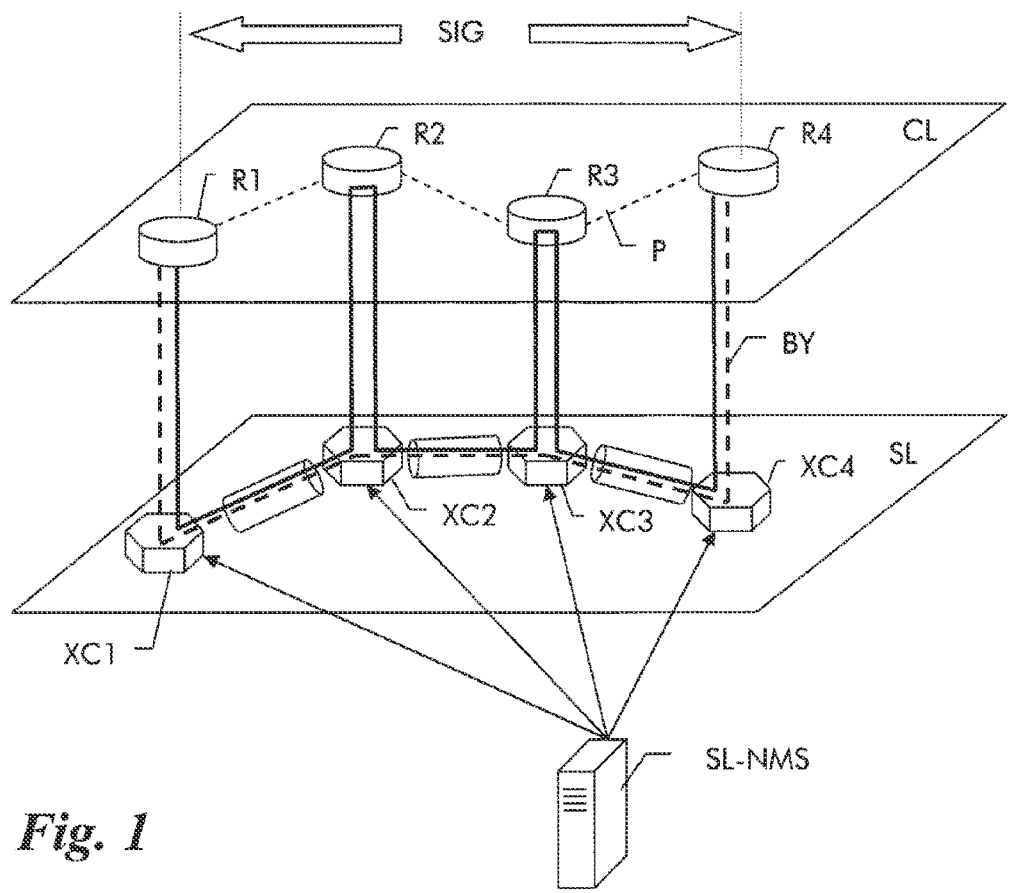
FIG. 1 shows a layered network with a packet layer as client layer and an underlying optical layer as service layer, where an optical bypass is established for optimized packet forwarding.

A reference scenario is shown in FIG. 1. The network has a layered structure with a service layer SL interconnecting network elements of a client layer CL. The service layer SL is an optical transport network with a number of network nodes such as digital crossconnects XC1-XC4. The service layer is a packet switched network with a number of packet nodes hereinafter called routers R1-R4, Router R1 is connected to a tributary or client port of network node XC1, router R2 to a client port of network node XC2, router R3 to a client port of network node XC3, and router R4 to a client port of network node XC4. In the optical transport network, which may operate in accordance with the standards for the SDH (ITU-T G.707) or OTN (ITU-T G.709) for instance, network node XC1 is physically connected over one or more optical fiber links in a daisy chain via network nodes XC2 and XC3 to network node XC4.

If router R1 has a data packet destined for router R4, the packet is sent from router R1 over the physical interconnection between network node XC1 and XC2 to router R2. Router R2 inspects the packet header and forwards the packet over network nodes XC2 and XC3 to router R3. Router R3 again inspects the packet header and forwards the data packet via network nodes XC3 and XC4 to destination router R4. Logically, the data packet follows the path P. Physically, it is transported over the optical links between network nodes XC1, XC2, XC3, and XC4, but has to be extracted and its header processed at each locally connected intermediate router R2 and R3 (see bold line in FIG. 1).

The optical transport network of the service layer SL can be configured through a network management system SL-NMS. In particular, the network nodes XC1-XC4 can be configured to (semi-)permanently switch connections between arbitrary input and output ports. Such permanent connections—termed crossconnections—can have different granularity. For example in an SDH network, a crossconnection can have a granularity from 2 Mb/s (VC-12) to 140 Mb/s (VC-4), and further up to integer multiples (N) of concatenated VC-4s (VC-4-Nc). In OTN networks, the granularity can be OTU0, an integer multiple thereof (ODUflex) or a higher ODUn (n=−1, 2, 3) granularity. In WDM networks, the granularity can also be an entire wavelength channel.

Therefore, if router R1 has a certain amount of data packets destined for router R4, and if this traffic volume persists for an extended period of time, then it could be more efficient to establish a semi-permanent optical bypass connection BY between network nodes XC1 and XC4, so that router R1 can send its data packets directly to router R4 without header processing at intermediate routers R2, R3.

In order to dynamically evaluate, whether such an optical bypass is economic and to negotiate such optical bypass connection between the routers of a packet network layer, a signaling SIG between routers R1 and R4 is described below.

In the following, embodiments will be described that provide a real-time arbitration mechanism to solve conflicts with interfering bypass requests from other routers. It will be described on the one hand, how routers identify desirable bypasses and on the other hand, a signaling protocol to arbitrate, establish, and release again bypass connections.

Figure 2:
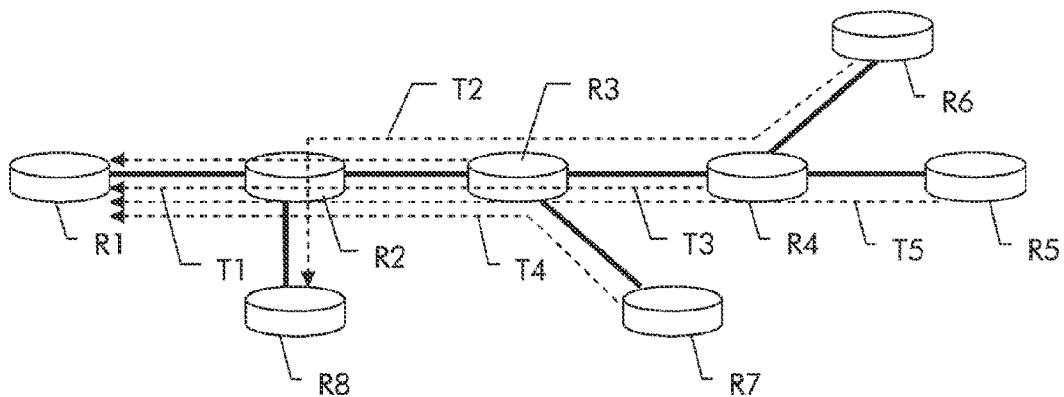
FIG. 2 shows traffic flows in a packet network layer.

FIG. 2 shows traffic flows between routers R1-R8 in a packet network, such as that of client layer CL in FIG. 1. Routers R1-R4 are similar to those in FIG. 1. In addition, routers R5 and R6 are connected to router R4, router R7 is connected to router R3, and router R8 is connected to router R2. All these connections, which are shown as bold lines, use underlying optical links of a service layer SL.

In addition, represented by broken lines, traffic streams between different routers are shown by way of example. For the sake of lucidity, we will lust consider the unidirectional case in the direction from right to left in FIG. 2. It would be understood by those skilled in the art, that this example can easily be extended to the bidirectional case. It is further assumed that the traffic streams are substantially constant over the timescale we look at.

The following traffic streams (T1-T5) are shown in FIG. 2:
traffic stream T1 from router R3 to router R1 with an assumed volume of 2 Gb/s;
traffic stream T2 from router R6 to router R8 with an assumed volume of 6 Gb/s;
traffic stream T3 from router R4 to router R1 with an assumed volume of 5 Gb/s;
traffic stream T4 from router R7 to router R1 with an assumed volume of 4 Gb/s; and
traffic stream T5 from router R5 to router R1 with an assumed volume of 5 Gb/s.

These traffic streams sum up to total traffic volumes between routers R1-R8 of:
16 Gb/s between routers R1 and R2;
22 Gb/s between routers R2 and R3;
16 Gb/s between routers R3 and R4;
5 Gb/s between routers R4 and R5;
6 Gb/s between routers R4 and R6 and between R2 and R8; and
4 Gb/s between routers R3 and R7.

In the embodiment below, it will be shown how in this situation the network performance can be improved by implementing optical bypasses in the service layer. To start with, the routing information that the routers store to decide upon bypass requests is explained with reference to FIG. 3.

Figure 3:
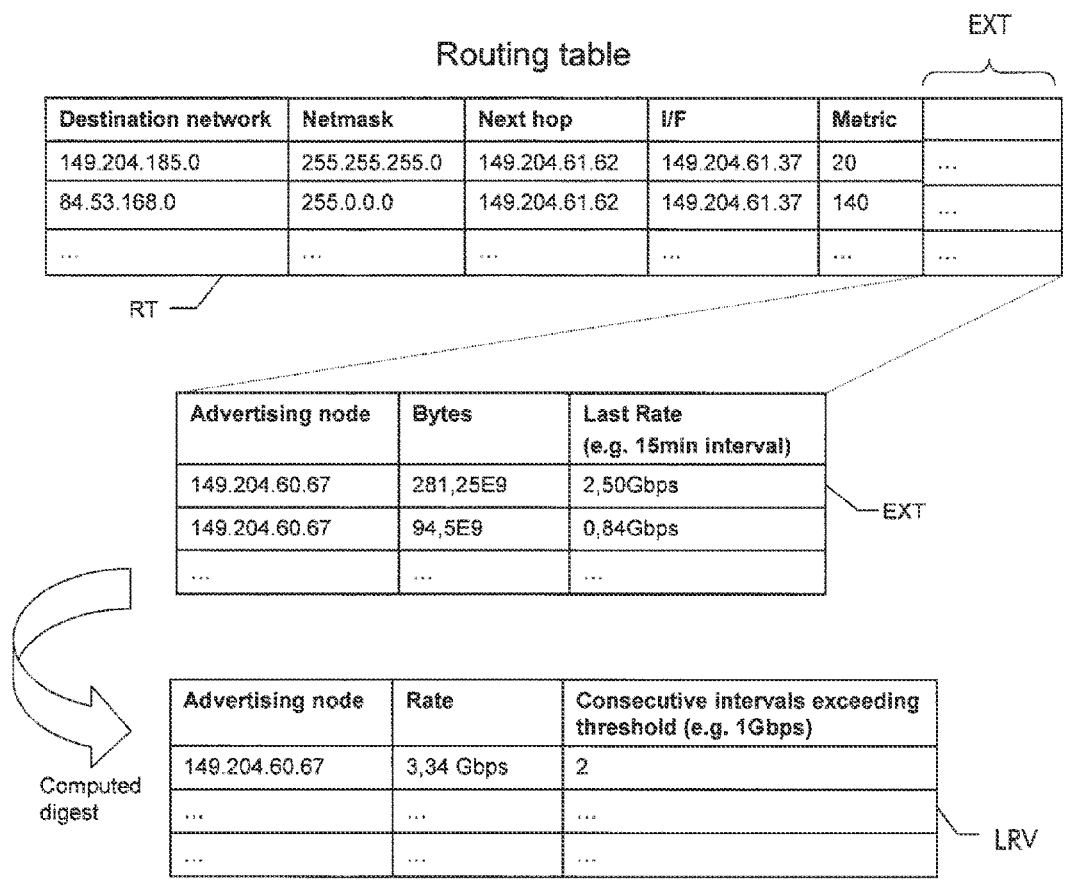
FIG. 3 shows routing tables with extensions to support dynamic set-up of optical bypasses.

FIG. 3 shows how the information for triggering the bypass is collected by IP routers. IP routers keep routing tables to determine packet forwarding based on IP address of received data packets. A routing table contains the destination network address; a netmask or subnetmask used for filtering the destination addresses; a next hop address, i.e. the address of the next station to which the packet is to be sent on the way to its final destination, an interface address if the router has more than one interfaces, and a metric, i.e. the cost of the path through which the packet is to be sent.

This routing table is extended by an extension EXT, which contains a byte counter for each prefix. The counter is updated with every forwarded packet. Because several prefixes are advertised by the same remote router, a mapping is maintained between prefix and advertising router. In this example the router 149.204.60.67 advertises the routes 149.204.185.0 and 84.53.168.0. At regular intervals, the total traffic rate to each advertising router is calculated (e.g. number of bytes per interval) and compared to a bypass threshold, such as for example 1 Gb/s. If the threshold is exceeded during a certain number of intervals, bypass signaling will be initiated. To keep track of the number of consecutive intervals, a last rate value LRV is stored for each advertising router to keep track of the number of consecutive intervals exceeding the threshold. The number of intervals is stored in another counter allocated to each advertising router.

When a bypass shall be established, the initiating router assigns a weight (i.e. a priority) to the bypass request which is determined by the amount of IP processing the bypass would save, and sends the request hop-by-hop downstream towards the destination router. The amount of IP processing saved is measured as a function of the traffic rate which triggers the bypass and the number of intermediate hops between the two routers. A simple embodiment of this function is for example multiplying the traffic rate with the number of hops. The number of hops to the other router can be derived from the initiating router's link state database. Alternatively the metric difference between the two routers can be used as an approximation for the number of intermediate hops.

The bypass request is signalled on the IP layer downstream towards the remote node and read and evaluated by all intermediate routers supporting the protocol. Intermediate routers having interfering bypass requests use the weight to decide which bypass has higher priority. Interfering bypasses are bypasses which have a part of their path in common. A conflicting bypass with a higher weight will be forwarded, while one with a lower or equal weighted request will be discarded and a negative acknowledgement (NAK) will be sent back to the originating router.

Coming now back to the scenario shown in FIG. 2, which gives an example of conflicting bypasses. It is assumed that the routing metric for each hop is equal to 1. The bypass threshold is set to 5 Gbps. Router R6 sends a bypass request towards R8. The request has the priority 18, i.e. 6 Gb/s×3 intermediate hops.

At router R4, the bypass request from R6 causes a conflict, because R4 has requests himself for the path towards routers R2 and R1, which share part of the path between R6 and R8.

R4 has identified potential bypasses to R2 and R1. Bypass R4-R1 has a weight of 20 (10 Gb/s×2 hops). Bypass R4-R2 has a weight of only 16 (16 Gb/s×1 hops). Therefore, bypass R4-R1 overrules the one to R2. It also overrules the request from R6. R4 therefore discards the bypass request R6-R8, sends out request R4-R1 towards R1 and sends a NAK back to R6 to inform R6 that its bypass request has been overruled by one with higher priority.

R6 now has to wait a waiting time period to make certain that any bypass established by a downstream node has been disseminated in the network by link state advertisements and that the routing tables of R6 reflect the new situation before it can send a new request to the same destination.

When the request from R4 arrives at R3, another conflict occurs, since R3 has a request to R1 with a weight of 16. R4-R1 has a higher weight than R3-R1, therefore R3 forwards the request R4-R1 and cancels its own request R3-R1. In the end R4-R1 is the only bypass request arriving at its destination.

The number of consecutive intervals an initiating router has to wait ensures that bypasses are not triggered by short term traffic changes, the length of an interval being dimensioned to be longer than a typical burst length in the network and the number of intervals providing a safety margin.

Figure 4:
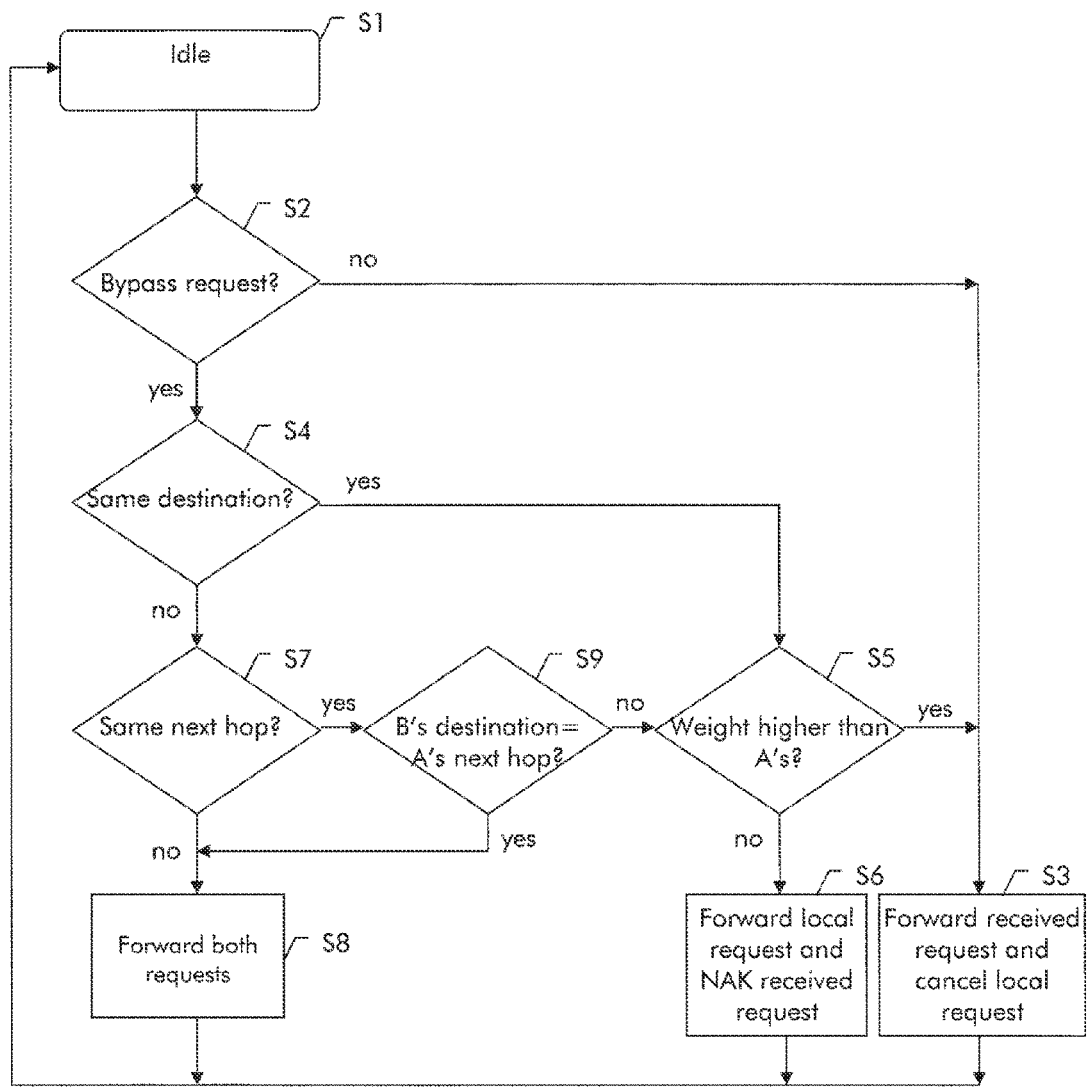
FIG. 4 shows a flow chart of the inventive method.

The forwarding rules applied by intermediate routers are given in FIG. 4. A router A starts in an idle state S1. Then it receives a bypass request from a router B. In step S2, the router A checks, whether it locally has an own bypass request it needs to transmit. If not, router A proceeds to step S3 and forwards the request to the next hop along the path for which the bypass request was issued.

If there is a conflicting bypass request in the loop, it has to check in step S4, whether the received bypass request and the local bypass request share the same destination. In this case, the traffic of the received request is completely included in the local bypass request and the weight breaks ties. Hence, in this case, router A checks in step S5 whether the weight of the received request is higher than the weight of its own request. If this is the case, it proceeds to step S3 and forwards the received requests and cancels the local one. If not, it forwards in step S6 the local request and sends back to router B a NAK message. It also stores its own active bypass state.

If the requests do not share the same destination in step S4, router A has to determine whether the requests are orthogonal or share at least part of the path. It therefore determines in step S7 whether both requests share the same next hop. If not, the requests are orthogonal and will be forwarded both in step S8 and router A stores its active bypass state.

If the requests share the same next hop in step S7, it will be checked in step S9 whether the next hop is already the final destination of the received request. Is that the case, the requests are orthogonal as well, since obviously no bypass can be established to a neighbouring node. In this case, router A proceeds to step S8 and forwards both requests. If not, router A proceeds to step S5 and determines which of the interfering requests has the higher weight.

When the destination router receives the bypass request, it checks if it has enough capacity on its own port towards the optical layer so satisfy the requested rate. If not, it sends an NAK to the originating router. Otherwise it reserves the capacity and sends an acknowledgement (ACK) back to the originating router. The acknowledgment contains the device id and port id of the optical device it has reserved for the bypass.

When the originating router receives the ACK message it issues a bypass request to the optical layer management system with the originating router's optical device and optical port id and the destination router's optical device and optical part id.

The bypass should preferably include a bandwidth reserve and could be requested via SNMP using a management connection between the optical layer management system and the IP router network (not shown).

Once the optical management system signals "bypass ready" to the originating router, the bypass is advertised in the terminating router's LSAs marked as "bypass" and other routers, especially upstream routers contributing to the traffic which triggered the bypass request, update their metric and therefore the weight of any later bypass request they send in this direction.

Routers that receive an NAK for their bypass requests must wait a configurable time before they send out a new request in this direction to allow for the flooding of recently established bypasses throughout the area. They can send, however, bypass requests along different paths to other destinations. A steady state is reached when no router has traffic to a remote router exceeding the threshold any more, or at least no further bypass request can be served anymore. (A remote router is considered a router which is further away than one hop because a bypass has to go around at least one router.)

The establishment of an optical bypass requires that routers have some information about the devices on their underlying layer and the interfaces via which they are connected to them. Communication between the client layer and the service layer can be established through an automatic information exchange protocol such as the GMPLS protocol suite. Alternatively, a communication between the service layer and the network management system of the service layer can be established. Router interfaces are configured with the device id and interface id of their underlying optical device and are thus able to tell the optical management system via a management connection such as SNMP between which optical ports a bypass connection is requested.

The protocols and procedures how to establish the bypass connection in the service layer are out of the scope of the subject embodiments, since it is well known as such in the art how to establish connections in an optical network. In particular, connections can be either set up through a distributed control plane in an automatically switched optical network (ASON) using well known GMPLS signaling, or can be established via management interfaces by a central network management system as the one shown in FIG. 1.

In the same way as bypasses can be requested, established bypasses can be released and decomposed again when the traffic stream between the two routers interconnected through a bypass falls below a release threshold. Bypass decomposition requests are initiated by the same node which initiated the bypass establishment. When the traffic rate has been below a release threshold for a number of consecutive intervals, the router calculates an alternative route to the bypass destination by excluding the bypass link. If it can find one, it sends a decomposition request via the alternative link which includes the current traffic rate triggering the decomposition. All routers in the path including the initiating router itself verify that potential decomposition requests they have themselves in the alternative path are still below the decomposition request if they include the additional traffic from the decomposed upstream bypass, if not they cancel their decomposition request for some time.

To ensure coordinated decomposition different strategies are possible: one possibility is that the mechanism for bypass establishment is used for decomposition in a reverse way such that the bypass with the lowest weight is decomposed first. Another possibility could be to decompose the bypass with the highest weight below the decomposition threshold first to free as many bypass resources as possible. When a decomposition request is received at the ultimate destination and acknowledged, a trigger message is sent to the service layer or its network management system to release the bypass connection requested to be decomposed.

Furthermore it is possible to extend or down-size existing bypasses by adding or removing capacity via signalling across the service layer interface to avoid parallel bypasses or decomposition and subsequent re-establishment of a smaller bypass to the same destination.

Routers only have full topology information for their area and can only identify advertising routers up to the border of their area, therefore bypasses established by the above described mechanism are limited to the diameter of the respective area or domain. To overcome this limitation, area border routers or autonomous system (AS) border routers can act as mediators.

If bypass initiating routers include a list of the contributing prefixes together with their respective traffic rate, area border routers can calculate the weight of the part of the path in the adjacent area and find out whether a longer cross area bypass with only part of the traffic has a higher weight than the bypass requested originally.

Figure 5:
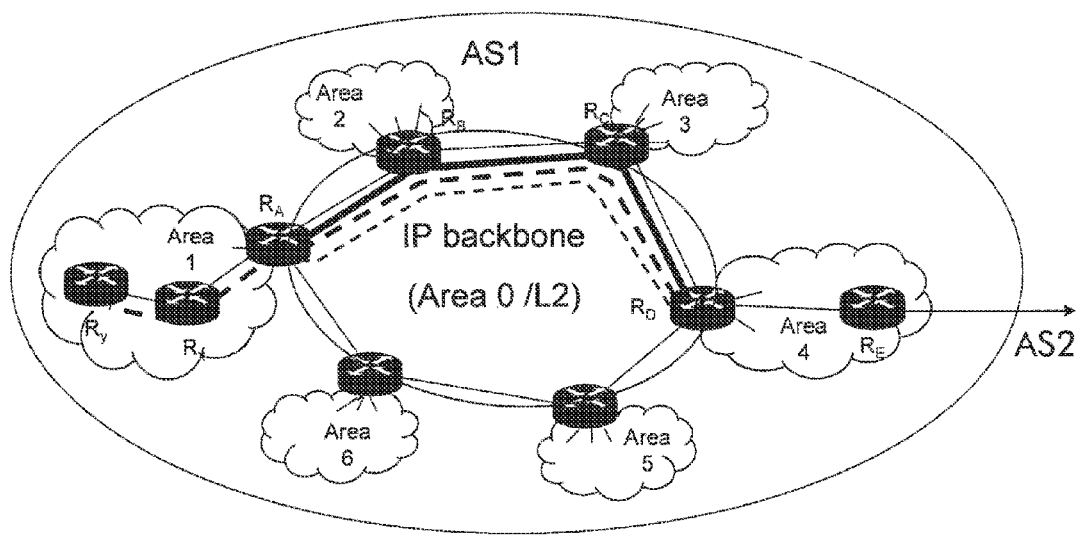
FIG. 5 shows an application of the inventive method in a provider network.

FIG. 5 shows how the technique could be applied to a service provider network architecture: router A receives a bypass request from router $R_D$ for e.g. 4 Gb/s. $R_D$ knows that e.g. 2.5 Gb/s of this traffic is to $R_Y$ while 1.5 Gb/s are to other routers. It computes that a bypass $R_D$-$R_Y$ with 2.5 Gb/s (weight=2.5×4=10) has a higher weight than a bypass $R_D$-$R_A$ (weight 4×2=8), modifies the bypass request accordingly with new destination address $R_Y$ and forwards it to $R_Y$. At the same time, it sends a modification information to $R_D$. After establishment of bypass $R_D$-$R_Y$ (bold dashed line), $R_D$ then can initiate a new request $R_D$-$R_A$ for the remaining 1.5 Gb/s traffic rate (light dashed line). In the same way, bypasses could be established across autonomous systems if permitted by the administrative authorities.

Figure 6:
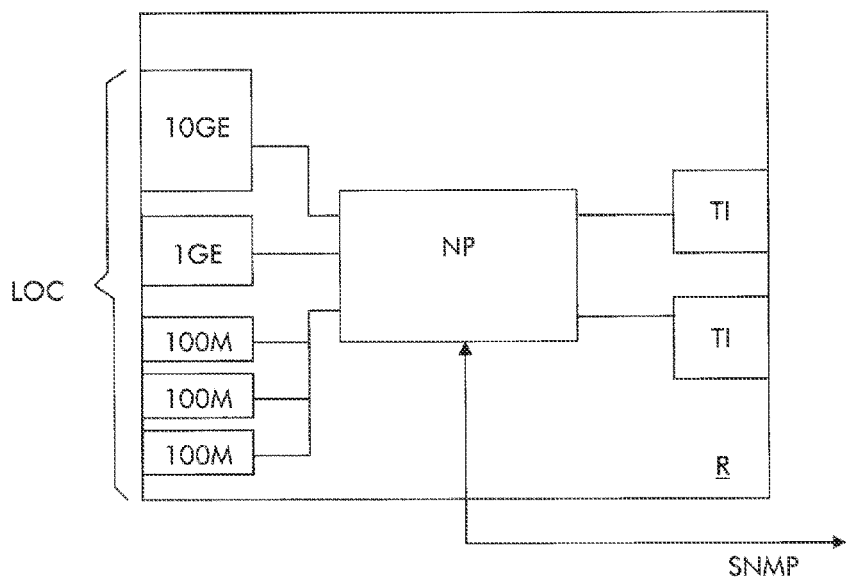
FIG. 6 shows a block diagram of a packet node.

The above embodiments can be implemented in any packet node or router. A block diagram is shown in FIG. 6. A packet node R has a processing device such as a network processor NP that can be programmed to process data packets and make routing decisions based on the address information contained in each data packet and locally stored routing information. A packet node typically has also a number of interfaces, which may include local packet interfaces LOC such as 10/100 Mb, 1GE, or 10GE Ethernet interfaces. In addition a packet node would have one or more transport interface TI for connection to an optical network node of the service layer network. To implement the above embodiments, the network processor NP (or the like) can be programmed to determine whether a traffic volume to be forwarded to a remote second packet node exceeds a predefined bypass threshold; and if so, to send a bypass request towards said remote second packet node.

To serve as an intermediate packet node, the network processor NP can further be programmed to process a first bypass request from an upstream packet node, and to determine whether it has a interfering local second bypass request and if that is the case, to determine which of the two requests has a higher weight; and to forward either said received first bypass request or, in case of an interfering local second bypass request, the one with the higher weight to a next hop towards along a path for which said bypass is requested. The packet node would further have a communication interface SNMP for sending a message to the service layer network requesting to set up the bypass connection. Obviously, the communication interface can also be implemented as part of the transport interfaces TI.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of configuring a network for optimized transport of packet data traffic by dynamically creating an optical bypass between remote network nodes; comprising
at a first packet node, determining whether a traffic volume to be forwarded to a remote second packet node exceeds a predefined bypass threshold;
if said traffic volume exceeds said bypass threshold, sending from said first packet node via an intermediate third packet node a bypass request towards said remote second packet node;
at said intermediate third packet node, processing said request and determining, whether said intermediate third packet node has an interfering second bypass request and if that is the case, which of the two requests has a higher weight;
forwarding either said bypass request or, in case of an interfering second bypass request, the one with the higher weight to said remote second packet node; and
at said second packet node, determining whether said bypass request can be served and if so, triggering in a service layer network establish a bypass connection in accordance with said bypass request.

2. A method according to claim 1, in case said bypass request cannot be served by said remote second packet node or in case an intermediate third packet node has an interfering higher weighted request, sending back to said first packet node a negative acknowledgement and at said first packet node, waiting a predetermined period of time until a new bypass request towards the same second packet node can be sent.

3. A method according to claim 1, wherein said weight determines an amount of header processing the requested bypass in said service layer would save at intermediate packet nodes.

4. A method according to claim 3, wherein said weight is a function of the traffic volume to be forwarded to said remote second packet node and a number of hops.

5. A method according to claim 3, wherein said weight is a function of the traffic volume to be forwarded to said remote second packet node and a routing metric for said second packet node.

6. A method according to claim 1, wherein said steps are repeated until all bypass requests are served or until no further bypass request can be served in said network.

7. A method according to claim 1, wherein after said bypass connection has been established and if the traffic volume between the two packet nodes interconnected through said bypass connection falls below a release threshold; the first packet node determines an alternative route to said second packet node excluding the said bypass connection and if one is found, sends a decomposition request via said alternative route.

8. A method according to claim 7, wherein an intermediate third or fourth packet node along said alternate route determine whether they have an interfering second decomposition request and if that is the case, whether this will be still below said release threshold if they include traffic from the bypass requested to be decomposed and if not cancel their decomposition request for a predetermined period of time.

9. A method according to claim 1, wherein if a bypass request is sent to a border router of another area of the same domain or another autonomous domain, said border router determines whether the requested bypass can be extended into an adjacent network domain and whether such an extended cross domain bypass has a higher weight than the bypass as originally requested, and if so forwards a modified bypass request for said extended cross area bypass to a projected destination router in said adjacent area or network domain.

10. A packet node, comprising a processing device for processing data packets to be forwarded and deciding based on address information contained in each data packet and locally stored routing information to which next hop to forward each data packet; and at least one transport interface for connection to a network node of service layer network; wherein said processing device is operable to determine whether a traffic volume to be forwarded to a remote second packet node exceeds a predefined bypass threshold; and if so, to send a bypass request towards said remote second packet node; said bypass request comprising a weight indicative of an amount of header processing the requested bypass, when established in said service layer network, would save at intermediate packet nodes.

11. A packet node in accordance with claim 10, further comprising a communication interface for upon receipt of an acknowledgment to said bypass request, sending a message to said service layer network requesting to set up said bypass connection in accordance with said bypass request.

12. A packet node in accordance with claim 10, wherein said processing device is operable to process a first bypass request from an upstream packet node, and to determine whether it has a interfering local second bypass request and if that is the case, to determine which of the two requests has a higher weight; and to forward either said received first bypass request or, in case of an interfering local second bypass request, the one with the higher weight to a next hop towards along a path for which said bypass is requested.

13. A packet node in accordance with claim 10, wherein said processing device is operable to determine in case a received bypass request is destined for it, whether said received bypass request can be served and if so, to send back an acknowledgment to the originating packet node of said received request, to trigger in a service layer network to establish said a bypass connection in accordance with said bypass request.

* * * * *